United States Patent [19]

Hanson

[11] 3,812,432

[45] May 21, 1974

[54] TONE DETECTOR

[75] Inventor: Robert Louis Hanson, Howell Township, N.J.

[73] Assignee: Bell Telephone Laboratories, Incorporated, Murray Hills, N.J.

[22] Filed: Jan. 5, 1973

[21] Appl. No.: 321,211

[52] U.S. Cl. .................. 328/138, 328/140, 328/137, 179/84 VF, 328/149

[51] Int. Cl. .............................................. H03k 9/06

[58] Field of Search ........... 328/137, 138, 140, 149; 327/233; 179/84 VF, 84 SS

[56] References Cited

UNITED STATES PATENTS

| | | | |
|---|---|---|---|
| 3,319,011 | 5/1967 | Maurusat | 179/84 |
| 3,539,731 | 11/1970 | Legedza | 179/84 |
| 3,413,490 | 11/1968 | Breuing et al. | 307/233 |
| 3,539,829 | 11/1970 | Langendorf et al. | 328/138 X |
| 3,555,435 | 1/1971 | Vosteen | 307/233 X |
| 3,562,675 | 2/1971 | Urell | 307/233 X |
| 3,593,275 | 7/1971 | Pumpe | 179/84 VF |
| 3,696,252 | 10/1972 | Chapman | 328/138 X |
| 3,740,586 | 6/1973 | Banks et al. | 307/233 X |

*Primary Examiner*—John S. Heyman
*Attorney, Agent, or Firm*—Thomas Stafford

[57] ABSTRACT

Individual call progress and test tone signals are accurately detected by employing a threshold detector in conjunction with a frequency component detector. The threshold detector generates a substantially constant amplitude pulsating signal representative of intervals between prescribed levels of the instantaneous amplitude of an applied tone signal. Peak amplitudes of individual frequency components of the pulsating signal are detected and, then, compared with a predetermined reference. The frequency component having a peak amplitude greater than the reference corresponds to the fundamental frequency of the applied tone signal being detected.

11 Claims, 7 Drawing Figures

TONE DETECTOR

BACKGROUND OF THE INVENTION

This invention relates to tone detector circuits and, more particularly, to tone detector circuits for detecting and recognizing call progress tone signals and test tone signals utilized in communications systems.

One of the earliest problems encountered in direct dialing telephone systems was that of providing an indication to a telephone customer of the progress of his telephone call. As is now well known in the art, this problem was solved by employing distinctive tone signal patterns to indicate each one of a variety of telephone call progress conditions. Thus, for example, ringing, line busy and overflow, i.e., all trunks busy, among others, each have an individual distinctive tone pattern at a preassigned frequency.

In addition to the call progress signals, tone signals having other distinctive patterns at preassigned frequencies are employed in testing the operativeness of telephone communication systems.

Both the call progress and test tone signals were originally designed to be detected and recognized by human operators. However, the ever increasing automation of telephone communication systems has led to a need for automatic detection and recognition of such signals.

One arrangement for automatically detecting and recognizing such tone signals is disclosed in U.S. Pat. No. 3,454,720 issued to G. Minchenko on July 8, 1969. Although the Minchenko patent describes apparatus that satisfactorily detects and recognizes call progress and test tone signals generated and transmitted by most telephone equipments, the ever increasing number of call progress and test tone generating equipments has resulted in the encountering of new problems.

Among these new problems which have been recognized is that many switching centers and transmission test centers employ signals rich in noise and harmonic content. Thus, call progress or test tone signals at a given preassigned frequency may have components at some higher frequency which has been assigned to other call progress or test tone signals. From practice, it has been observed that prior known call progress and test tone detector circuits are unable to distinguish which signal is actually being received when the received signal is noisy, includes higher order harmonics of lower frequency signals or is a multitone signal. Thus, results are obtained which erroneously indicate the reception of other than the call progress or test tone signal being transmitted. Such errors cannot be tolerated in modern direct dialing telephone communication systems.

SUMMARY OF THE INVENTION

These and other problems are resolved in a tone detector, in accordance with the invention, by turning to account characteristics of a substantially constant amplitude pulsating signal, namely, that the amplitudes of frequency components of such a signal are readily determinable. Accordingly, "higher" frequency components of an applied signal are substantially rejected by generating a substantially constant amplitude pulsating signal representative of periodic intervals of similar signal characteristics, for example, the intervals between prescribed amplitude levels of an applied signal. Then, the presence of a signal at a frequency of interest is distinguished from harmonics of "lower" frequency signals by comparing amplitudes of individual frequency components of the pulsating signal with an associated prescribed reference signal. Deleterious effects caused by noise signal components are minimized by inhibiting generation of the pulsating signal during intervals in which the applied signal does not meet a prescribed criterion.

More specifically, a tone detector, in accordance with the invention, includes a threshold detector for generating a substantially constant amplitude pulsating signal representative of intervals between prescribed levels of the instantaneous amplitude of an applied signal, for example, positive and negative peak amplitudes. No pulsating signal is generated during intervals in which the amplitude of the applied signal is below the prescribed level. The presence of frequency components of interest in the applied signal is determined by supplying the pulsating signal to appropriate filters. The peak value of the output from each filter is detected and compared with a predetermined reference signal to determine, in accordance with the invention, whether the particular filter output represents the fundamental frequency of the applied signal.

An additional aspect of the instant invention is concerned with eliminating possible detection errors caused by noise signals. Such errors are substantially eliminated, in accordance with the invention, by inhibiting the operation of the threshold detector until the applied signal has an average amplitude greater than a prescribed level. Simply stated, the threshold detector is disabled until the average amplitude of the applied signal exceeds a predetermined value.

In one application of the present invention, signals having a period less than a prescribed value and a duration greater than a prescribed interval only are of interest. Accordingly, generation of output signals from the tone detector of the instant invention is inhibited unless these conditions are met. This is achieved by employing a retriggerable monostable multivibrator and a delay unit in conjunction with a plurality of coincidence gates. The gates are connected in a one-to-one circuit relationship with the comparator outputs and with the delay unit output. The unstable interval of the monostable multivibrator is set at a predetermined value so that the multivibrator output remains in a predetermined state only when the interval between pulses of the threshold detector output is less than a prescribed interval. The delay unit yields an output only after the multivibrator output has remained in the predetermined state for more than a prescribed interval. Each of the gates yields an output only when the delay unit output signal and the corresponding comparator output signal are in coincidence.

BRIEF DESCRIPTION OF THE DRAWINGS

These and other objects and advantages of the invention will be more fully understood from the following detailed description taken in connection with the appended drawings wherein.

DETAILED DESCRIPTION

Figure 1:
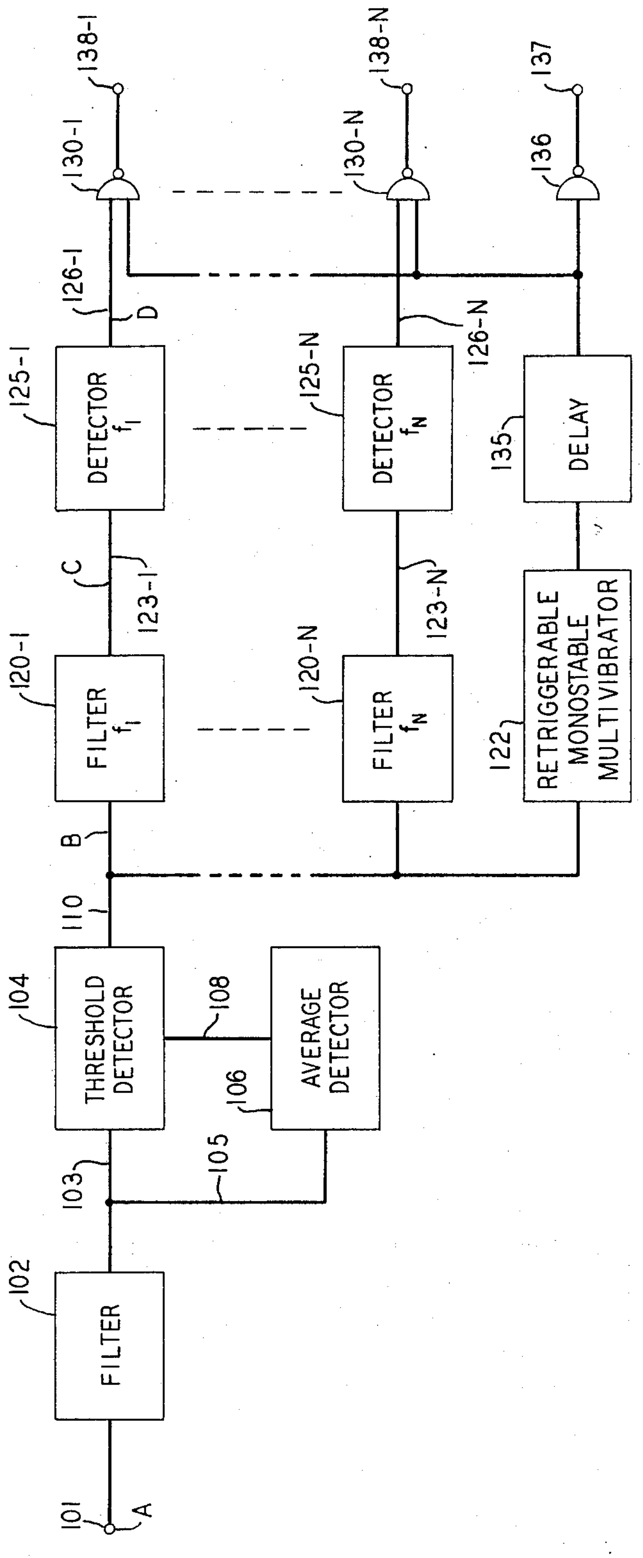
FIG. 1 depicts a tone detector circuit illustrating the invention.

FIG. 1 illustrates in simplified block diagram form a tone detector circuit in accordance with the invention. Signals to be detected are supplied via input terminal 101 to filter 102. Filter 102 may be any one of numerous filters known in the art capable of passing signals within a frequency band of interest. In many applications of the invention, filter 102 may be eliminated. Signals within the passband of filter 102 are supplied via circuit path 103 to threshold detector 104 and via circuit path 105 to average detector 106.

Figure 2:
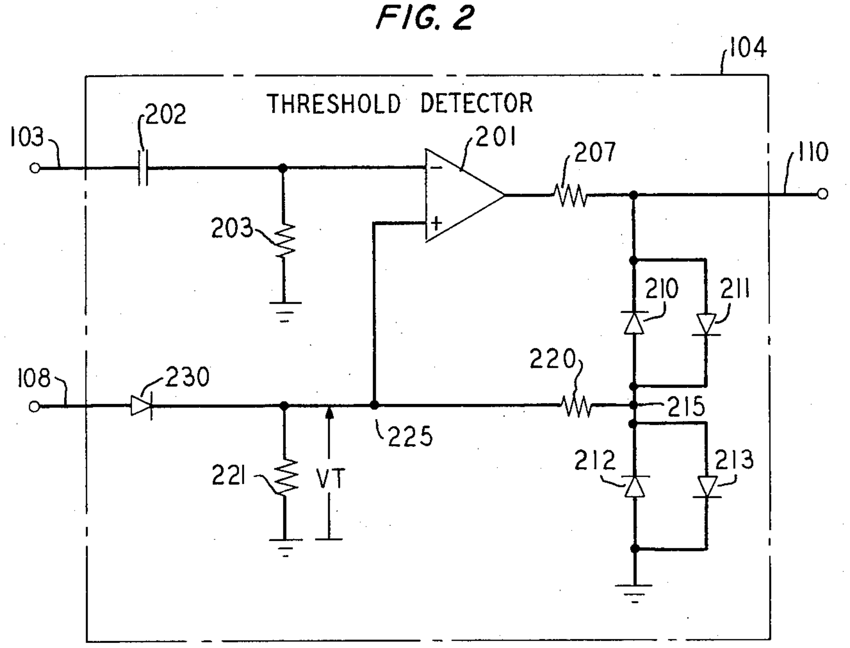
FIG. 2 shows in greater detail a threshold detector which may be utilized in the tone detector of FIG. 1.

As is well known, the waveform of an applied signal, for example, a sinusoid at a given fundamental frequency, is perturbed by "higher" frequency signal components. For a given range of frequencies and component signal amplitudes, the positive and negative peak amplitudes of a composite signal, i.e., fundamental frequency and "higher" frequency components, tend to be the positive and negative peak amplitudes of the fundamental frequency signal. Simply stated, the peak amplitude of the envelope of the composite signal represents the peak amplitude of the "lower" frequency signal being detected. Accordingly, threshold detector 104 is employed, in accordance with the invention, to reject "higher" frequency components from an applied signal to be detected. To this end, detector 104 is adjusted so that it yields a pulsating output signal, at 110, representative of intervals between prescribed amplitude levels of the signal being detected, for example, positive and negative peak amplitudes. This pulsating output is generated only when the amplitude of the applied signal exceeds the prescribed level. Threshold detector 104 may also be any one of numerous circuit arrangements capable of generating a substantially constant amplitude pulsating signal representative of intervals between prescribed values of the instantaneous amplitude of an applied signal. Details of a preferred threshold detector are shown in FIG. 2, to be discussed below.

Most, if not all, threshold detectors also respond to noise signals, for example, white noise, to generate an output signal. As is well known, such noise signals have relatively low average amplitude levels but do have peak amplitude levels which equal or even exceed the normal amplitude levels of signals being detected. Errors possible because of detecting noise peaks and the like are minimized, in accordance with the invention, by selectively inhibiting operation of threshold detector 104 during intervals in which the average amplitude of the applied signal being detected is below a prescribed level. This is achieved by employing average detector 106. Thus, detector 106 senses the applied signal and generates, at 108, first and second predetermined output signals representative of intervals in which the applied signal has an average amplitude level greater than and less than a predetermined level, respectively. These output signals are supplied via circuit path 108 to enable or disable threshold detector 104 when the average amplitude of the applied signal is above or below the predetermined level, respectively.

When enabled, threshold detector 104 responds to an applied signal, having an amplitude greater than a prescribed level, to generate a constant amplitude pulsating signal representative of intervals between prescribed amplitude levels of the applied signal. It follows that if the applied signal is a sinusoid, the pulsating output of detector 104 is a substantially symmetrical rectangular waveform having a period substantially equal to the period of the applied signal. This rectangular waveform characteristic of the output from threshold detector 104 is turned to account, in accordance with the invention, to reject harmonics of "lower" frequency signals, thereby eliminating possible erroneous indications of detecting "higher" frequency tone signals when a "lower" frequency tone is being transmitted.

As is well known, a symmetrical rectangular waveform includes signal components at a fundamental frequency and at odd order harmonic frequencies. Thus, the pulsating output of threshold detector 104 includes fundamental frequency component $f_o$ and odd order harmonic components $Nf_o$, $N=3,5,7 \ldots$. By employing Fourier analysis techniques, amplitudes $A_N$, $N=1, 3, 5, \ldots$, of the corresponding frequency components are readily determinable. Indeed, it can be shown that the amplitudes of harmonic components $Nf_o$ are substantially lower in magnitude than the amplitude of fundamental frequency component $f_o$.

Accordingly, the pulsating output of threshold detector 104 is supplied via circuit path 110 to filters 120-1 through 120-N. Each of filters 120 is of a type capable of passing a narrow band of frequencies centered at a specific frequency of interest, for example, frequencies $f_1$ through $f_N$. The pulsating output of threshold detector 104 is also supplied via circuit path 110 to retriggerable monostable multivibrator 122 to be discussed below. The outputs from each of filters 120 is a sinusoidal signal representative of the frequency content of the pulsating output of threshold detector 104 at the individual filter frequency, namely, frequencies $f_1$ through $f_N$.

Whether the output from each of filters 120-1 through 120-N represents a fundamental frequency of interest or merely a harmonic of some "lower" frequency is determined by supplying the outputs of filters 120-1 through 120-N to frequency detectors 125-1 through 125-N, respectively.

Figure 4:
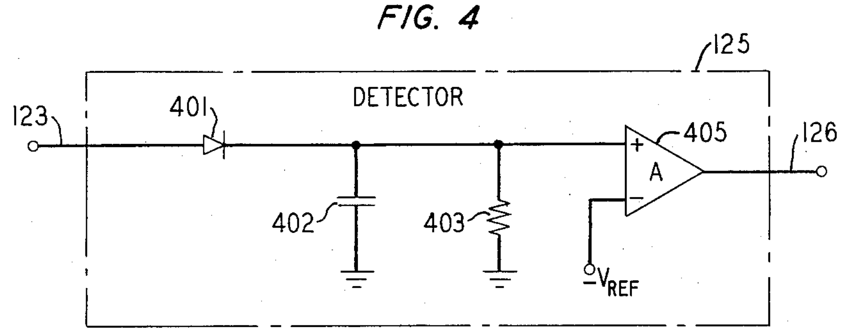
FIG. 4 depicts details of a frequency component detector which may be used in the tone detector of FIG. 1.

Detectors 125 are employed, in accordance with the invention, to detect the peak amplitude of the output from an associated one of filters 120 and, then, to compare the detected peak amplitude with a predetermined reference voltage representative of the desired fundamental frequency component. If the peak amplitude of the filter output signal is greater than the reference voltage, a predetermined signal is developed at the output of the corresponding one of detectors 125, for example, a signal representative of a logical "1." This output may be employed as desired to indicate the accurate detection of the corresponding frequency component. Although numerous circuits may be equally employed for obtaining such an indication that a signal of interest has been detected, it is preferred that a circuit as shown in FIG. 4 be employed, to be discussed below.

In one application of the present invention, it is further desired that an indication, that a signal has been detected is generated only if the applied signal is a socalled "good" signal. A "good" signal has been defined for certain applications as one which meets prescribed duration criteria. Specifically, the applied signal must be such that the interval between pulse signals developed at the output of threshold detector 104 is less than a prescribed interval, for example, 30 milliseconds, and that the pulsating signal has a duration greater than a prescribed interval, for example, 140 milliseconds. Whether the pulsating output of threshold detector 104 and, hence, the applied signal meet these criteria is determined by employing retriggerable monostable multivibrator 122 in conjunction with delay unit 135. The unstable interval of monostable 122 is set at a desired interval so that monostable 122 is retriggered before "timing-out" when the interval between pulses in the output of threshold 104 is less than a prescribed interval, namely, 30 milliseconds. Thus, when the interval between pulses is less than 30 milliseconds, the output of monostable 122 remains in a high state. Then, if the output from threshold detector 104 exists, as indicated by the output of monostable 122 remaining in a high state, for more than a prescribed interval, in this example 140 milliseconds, delay unit 135 yields, in well known fashion, a high state signal at its output.

The output of delay unit 135 is supplied to a first input of coincidence gates 130-1 through 130-N and to inverting gate 136. Gate 136 responds to the high state output from delay unit 135 to yield a low state output at 137 indicating a "good" signal has been received. The output from gate 136 may be utilized as desired. Outputs from frequency detectors 125-1 through 125-N are supplied in a one-to-one circuit relationship to a second input of coincidence gates 130-1 through 130-N. In this example, gates 130 and gate 136 are NAND gates of a type now well known in the art. Accordingly, when the output from delay unit 135 is in a high state and an output from any one of frequency detectors 125 is in a high state, a low state signal is generated at the output of the corresponding one of NAND gates 130, namely, at one of outputs 138-1 through 138-N. This output signal may also be utilized as desired to indicate that the corresponding tone signal has been detected.

Turning now to FIG. 2 there are shown details of threshold detector 104 which may be utilized in the circuit of FIG. 1. Detector 104 is essentially a peak detector including differential amplifier 201. Amplifier 201 is a "high" gain type, now well known in the art, commonly referred to as an operational amplifier. Signals to be detected are supplied via circuit path 103 and coupling capacitor 202 to the inverting (−) input of amplifier 201. Resistor 203 provides a direct current path to ground reference potential for holding the signal level at the inverting input of amplifier 201 at ground potential during intervals when no input signal is being supplied via circuit path 103. The output of amplifier 201 is supplied via resistor 207 to circuit path 110 and to diodes 210 and 211.

Diodes 210 and 211 are arranged to pass negative and positive outputs of amplifier 201, respectively. Diodes 212 and 213 are connected in series with diode 210 and 211 and ground reference. Diodes 212 and 213 are also arranged to pass negative and positive signals, respectively. Diodes 210 through 213 are employed to maintain a constant magnitude output from amplifier 210. Diodes 212 and 213 also insure that the magnitude of a signal developed at circuit point 215 is also constant. Resistor 207 limits the magnitude of current being supplied to diodes 210 through 213. The signal developed at circuit point 215 is proportionately supplied via resistor 220 to the noninverting (+) input of amplifier 201. Resistor 220 in conjunction with resistor 221 forms a voltage divider for establishing predetermined threshold voltage $V_T$ at circuit point 225. The magnitude of voltage $V_T$ is determined, in well known fashion, by the resistance values of resistors 220 and 221 and the magnitude of the voltage developed at circuit point 215. In practice, the magnitude of voltage $V_T$ is adjusted to equal the lowest acceptable peak amplitude.

Diode 230 is employed to supply a signal having a predetermined polarity from circuit path 108 to disable detector 104. Accordingly, detector 104 is disabled from generating a pulsating output by supplying via circuit path 108 a signal having sufficient amplitude to develop a positive voltage across resistor 221 sufficient to bias amplifier 201 into a predetermined saturated state. This inhibits amplifier 201 from responding to signals supplied via circuit path 103 to its inverting input.

Now, assuming that detector 104 is enabled i.e., no signal is being supplied via circuit path 108, operation is straightforward. Initially, with no signal supplied via circuit path 103, the output of amplifier 201 assumes a stable state, for example, either at a positive saturation voltage or at a negative saturation voltage. In this example, it is assumed that the output of amplifier 201 is initially at a negative saturation voltage. This negative output is positively fed back via diode 210 and resistor 220 to the noninverting (+) input of amplifier 201, thereby maintaining the output of amplifier 201 at the negative saturation voltage. A signal being detected supplied to the inverting (−) input of amplifier 201, for example, a signal as shown in waveform A OF FIG. 5A, has no effect on the output until the signal achieves a negative amplitude greater than the magnitude of $V_T$, i.e., the potential applied to the noninverting (+) input. Once the input signal reaches this negative amplitude, the output of amplifier 201 is switched from the negative voltage to a positive saturation voltage. Once this occurs, the positive feedback of the positive output voltage from amplifier 201 via diode 211 and resistor 220 to the noninverting (+) input maintains the output of amplifier 201 at the positive saturation voltage until the amplitude of the supplied input signal attains a positive amplitude which exceeds threshold voltage $V_T$ supplied to the noninverting (+) input of amplifier 201. This process is repeated for each cycle of the supplied signal to yield a substantially constant amplitude pulsating signal at circuit path 110, as shown in waveform B of FIG. 5A.

It is readily seen that the level of threshold voltage $V_T$ and, hence, the detection level is adjustable by varying the resistance values of resistors 220 and 221. From practice, it has been found that the magnitude of threshold voltage $V_T$ should be set at a value to establish a detection level substantially at but less than the peak value of the supplied signal. This insures that the output of threshold detector 104 is a substantially symmetrical rectangular waveform when the supplied signal includes multitone signals.

Figure 3:
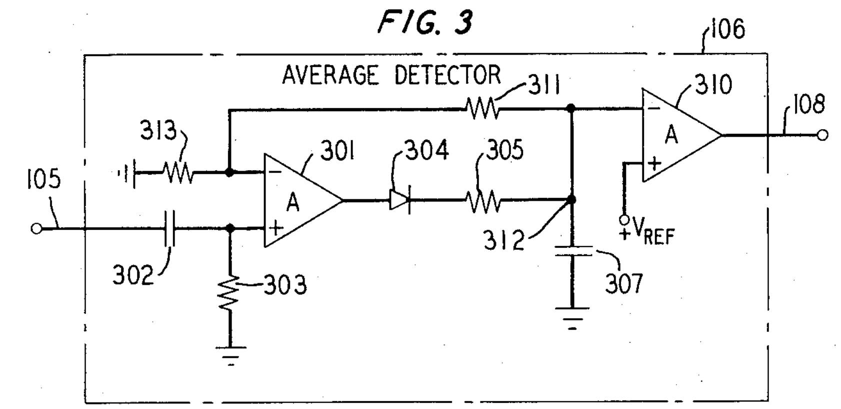
FIG. 3 illustrates details of an average detector which may be employed in the circuit of FIG. 1.

FIG. 3 illustrates details of average detector 106 which may be employed in the circuit of FIG. 1. Detector 106 includes differential amplifier 301 which also is of a "high" gain type commonly referred to as an operational amplifier. Signals to be detected are supplied via circuit path 105 and coupling capacitor 302 to the noninverting (+) input of amplifier 301. Resistor 303 is employed to provide a direct current path to ground potential for holding the noninverting (+) input at ground potential during intervals in which no signal is being supplied via circuit path 105. The output from amplifier 301 is supplied via diode 304 and resistor 305 to capacitor 307, to the noninverting (−) input of amplifier 310 and to resistor 311. Diode 304 is poled to pass signals having a positive polarity. Capacitor 307 is connected between circuit point 312 and ground potential. Resistor 311 and 313 form a voltage divider and are employed to supply proportionately the voltage developed across capacitor 307, at 312, to the inverting (−) input of amplifier 301. The component values of resistor 305, 311 and 313 and capacitor 307 are selected so that capacitor 307 is charged and discharged at predetermined rates.

Amplifier 310 is also a "high" gain differential amplifier of the operational type and is utilized in this example as a comparator. To this end, predetermined positive reference voltage $V_{REF}$ is supplied to the noninverting (+) input of amplifier 310. Thus, the output of amplifier 310, at 108, remains at a predetermined positive saturation voltage until the amplitude of the voltage developed across capacitor 307 supplied to the inverting (−) input of amplifier 310 exceeds voltage $V_{REF}$. This initial positive output from amplifier 310 is supplied via circuit path 108 to disable detector 104 (FIG. 1) during this initial interval. After several cycles of the supplied signal being detected, the potential developed at the inverting (−) input of amplifier 301 (FIG. 3) approaches the peak amplitude value of the signal supplied via circuit path 105 to the noninverting (+) input. Thereafter, amplifier 301 and its associated circuitry function in a linear mode. Consequently, only the difference voltage, i.e., the instantaneous signal level supplied to the noninverting (+) input less the signal level developed at the inverting (−) input, is amplified and the voltage developed across capacitor 307 is essentially representative of the average value of the peak amplitude of the supplied signal. Once the voltage developed across capacitor 307, i.e., the average amplitude value of the signal being detected, reaches a predetermined level which exceeds reference voltage $V_{REF}$, comparator 310 is switched to generate a predetermined negative voltage at its output. This enables threshold detector 104.

FIG. 4 shows details of frequency detector 125. Detector 125 is essentially a peak detector and comparator arrangement. Accordingly, a unidirectional signal representative of the peak amplitude of a signal supplied via circuit path 123 is generated, in well known fashion, by employing diode 401, capacitor 402 and resistor 403. The unidirectional signal developed across capacitor 402 is supplied to the noninverting (+) input of differential amplifier 405. Predetermined negative reference voltage $-V_{REF}$, representative of the amplitude of fundamental frequency component of interest, for example, frequency $f_1$, is supplied to the inverting input (−) of amplifier 405. Operation of detector 125 is straightforward. When the peak value of the signal supplied via circuit path 123 is less than voltage $V_{REF}$, the output from amplifier 405, at 126, is a predetermined negative voltage. When the peak value of the supplied signals exceeds reference voltage $V_{REF}$, the output of amplifier 405, at 126, switches to a predetermined positive voltage.

Figure 5A:
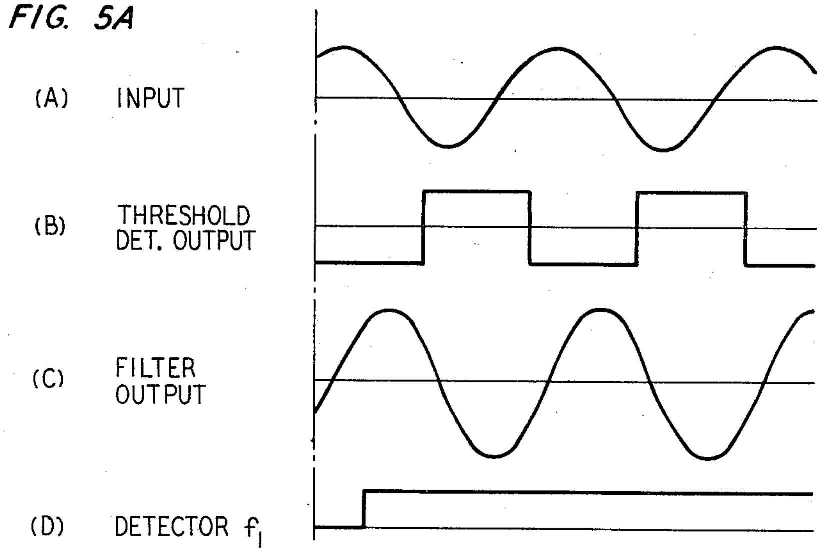
FIGS. 5A, 5B and 5C each show a sequence of waveforms useful in describing operational modes of the tone detector of FIG. 1.

Operation of the invention is best explained by utilizing a sequence of waveforms. Accordingly, FIGS. 5A through 5C each depicts a sequence of waveforms developed at points in the circuit of FIG. 1. The waveforms have been labeled to correspond to the circuit points of FIG. 1. Accordingly, waveform A of FIG. 5A shows a signal supplied to input terminal 101 (FIG. 1) having little, if any, harmonic or "higher" frequency component content. Threshold detector 104 responds to the supplied signal to generate a substantially constant amplitude symmetrical rectangular waveform, as shown in waveform B of FIG. 5A. This signal is supplied to filters 120 and retriggerable monostable multivibrator 122. Filters 120 generate signals representative of the frequency component in the pulsating output from detector 104. In this example, it is assumed that the frequency of the supplied signal being detected is frequency $f_1$. Accordingly, filter 120-1 generates a signal, at 123-1, substantially as shown in waveform C of FIG. 5A. The output from filter 120-1 is supplied via circuit path 123-1 to frequency detector 125-1. If the peak amplitude of the filter output, as shown in waveform C of FIG. 5A, exceeds a predetermined reference potential representative of the amplitude of frequency $f_1$ of interest, detector 125-1 yields, at 126-1, a signal representative of a logical "1" as shown in waveform D of FIG. 5A. For purposes of this analysis, it is assumed that the signal being detected is a "good" signal and, hence, delay unit 135 yields a high state signal at the appropriate instant which is in coincidence with the output of detector 125-1. Accordingly, a low state signal representative of a logical "0" is generated by NAND gate 130-1 at output 138-1.

Figure 5B:
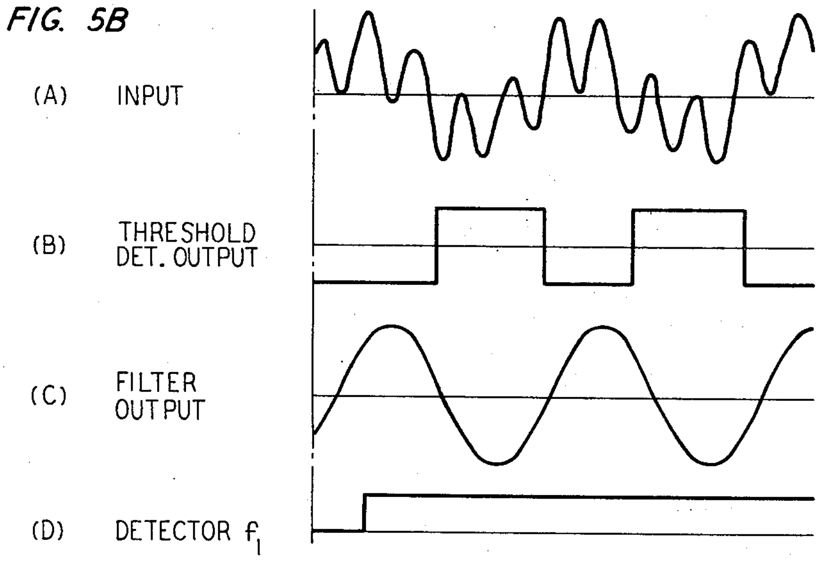

FIG. 5B shows a sequence of waveforms developed in the embodiment of the instant invention shown in FIG. 1 when the supplied signal is a multitone signal as illustrated in waveform A of FIG. 5B. The supplied signal, shown in waveform A of FIG. 5B, is the sum of a signal at a first frequency and a signal at a substantially "higher" second frequency having an amplitude substantially equal to the amplitude of the first frequency signal. Threshold detector 104 (FIG. 4) responds to the multitone signal to generate at 110, a pulsating signal as shown in waveform B of FIG. 5B. The output from threshold detector 104 in this instance is essentially identical to the output resulting from an input signal having little, if any, "higher" frequency components, for example, as shown in waveform B of FIG. 5A. In turn, the outputs from filter 120-1 (FIG. 1) and frequency detector 125-1, as shown in waveforms C and D of FIG. 5B, respectively, are also essentially identical to those illustrated in waveforms C and D of FIG. 5A.

Experimental results have shown that the output from threshold detector 104 is only slightly affected when the input signal includes "higher" frequency components having amplitudes less than twice the amplitude of the signal of interest. However, as the amplitude of the higher frequency components approaches twice that of the signal of interest, the rectangular waveform output of detector 104 becomes more distorted from symmetrical. Consequently, the amplitude of the signal output from filter 120-1 decreases. Thus, by reducing the value of reference potential $-V_{REF}$ in frequency detector 125-1 (FIG. 4) to be slightly below the anticipated peak value of the frequency component of interest, the signal of interest may be readily detected even in the presence of higher frequency components.

Figure 5C:
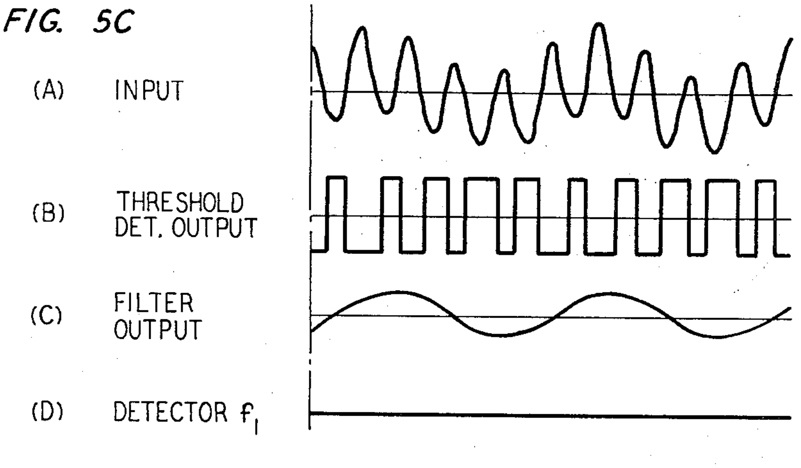

Once the amplitude of the "higher" frequency components exceed twice that of the signal of interest, the composite signal is essentially as shown in waveform A of FIG. 5C. The output from threshold detector 104, as shown in waveform B of FIG. 5C, has the basic frequency of the "higher" frequency component and the "lower" frequency component is present only as a modulation product. The resulting output from filter 120-1 is shown in waveform C of FIG. 5C. Note the substantial reduction in amplitude. Since the amplitude of the filter output is below reference potential $V_{REF}$, frequency detector 125-1 yields a low state signal at its output as shown in waveform D of FIG. 5C, thereby indicating that frequency $F_1$ is not the fundamental frequency of the supplied signal.

The above described arrangements are, of course, merely illustrative of the application of the principles of this invention. Numerous other arrangements may be devised by those skilled in the art without departing from the spirit or scope of the invention.

What is claimed is:

1. A tone detector circuit which comprises:

means responsive to an applied signal for generating a pulsating signal having a substantially constant amplitude and being representative of intervals between prescribed amplitude levels of said applied signal, said pulsating signal generating means being selectively disabled in response to a predetermined signal being supplied thereto;

means in circuit relationship with said pulsating signal generating means and being responsive to at least one predetermined frequency component of said pulsating signal for generating a pulse signal representative of intervals when the amplitude of said at least one frequency component exceeds a predetermined reference level;

means for detecting a predetermined amplitude characteristic of said applied signal; and means in circuit relationship with said amplitude detecting means and said pulsating signal generating means and being responsive to the output from said amplitude detecting means for generating a signal to disable said pulsating signal generating means during intervals when the output from said amplitude detecting means is below a predetermined level.

2. A tone detector as defined in claim 1 wherein said amplitude detecting means includes means for generating a signal representative of the average amplitude of said applied signal.

3. A tone detector as defined in claim 1 wherein said pulsating signal generating means includes a threshold detector for generating a pulsating signal having a substantially constant amplitude and being representative of intervals between prescribed values of the instantaneous amplitude of said applied signal.

4. A tone detector as defined in claim 3 wherein said pulse signal generating means includes filter means in circuit relationship with said threshold detector for passing only said at least one frequency component of said pulsating signal and level detector means in circuit with said filter means for generating said pulse signal during intervals in which the amplitude of said at least one frequency component exceeds a predetermined level.

5. A tone detector as defined in claim 4 wherein said level detector means includes peak detector means in circuit with said filter means for generating a unipolarity signal having an amplitude proportional to the peak amplitude value of said at least one frequency component output from said filter means and comparator means having first and second inputs and an output, a reference signal source being connected in circuit with said first input, said peak detector means being connected in circuit with said second input and said comparator means being responsive to a reference signal and to said unipolarity signal for generating said pulse signal at said comparator means output during intervals in which the amplitude of said unipolarity signal exceeds the amplitude of said reference signal.

6. A tone detector as defined in claim 3 further including interval detector means in circuit relationship with said threshold detector and being responsive to said pulsating signal for generating a predetermined signal only during intervals in which the duration of said pulsating signal exceeds a prescribed interval and at least one means in circuit with said interval detector means and said pulse signal generating means and being responsive to said pulse signal and said interval detector means output for generating an output only during intervals in which said pulse signal and said interval detector means output are in coincidence.

7. A tone detector as defined in claim 6 wherein said interval detector means includes a retriggerable monostable multivibrator connected in circuit with said threshold detector and having a predetermined unstable interval and means connected in circuit with said multivibrator and being responsive to an output signal from said multivibrator for generating a predetermined signal during intervals in which the output of said multivibrator remains in a predetermined state for a duration greater than a prescribed interval.

8. A tone detector circuit which comprises:

a threshold detector responsive to an applied signal having an amplitude greater than a predetermined level for generating a substantially constant amplitude pulsating signal representative of intervals between prescribed levels of the instantaneous amplitude of said applied signal;

means for detecting a prescribed amplitude characteristic of said applied signal;

means connected in circuit relationship with said amplitude detecting means and said threshold detector and being responsive to the output from said amplitude detecting means for generating signals to enable and disable said threshold detector during intervals when the output from said amplitude detecting means is above and below a prescribed level, respectively;

a plurality of filters in circuit with said threshold detector, each of said filters being arranged to pass an individual frequency component of said pulsating signal;

a plurality of peak detector means being in one-to-one circuit relationship with said filters for detecting the peak amplitude of the corresponding passed frequency component; and a plurality of comparator means being in one-to-one circuit relationship with said peak detecting means for comparing said detected peak amplitude to a predetermined reference, wherein the frequency component having a peak amplitude greater than said reference represents the fundamental frequency of said applied signal.

9. A tone detector circuit which comprises:

means responsive to an applied signal for generating a pulsating signal having a substantially constant amplitude and being representative of intervals between prescribed amplitude levels of said applied signal, said pulsating signal generating means being selectively enabled and disabled in response to predetermined signals supplied thereto;

means in circuit relationship with said pulsating signal generating means and being responsive to at least one predetermined frequency component of said pulsating signal for generating a pulse signal representative of intervals when the amplitude of said at least one frequency component exceeds a predetermined reference level;

means for generating a signal representative of the average amplitude value of said applied signal;

a reference signal source; and comparator means having first and second inputs and an output, said average amplitude signal generating means being in circuit with said first input, said reference signal source being in circuit with said second input, said output being in circuit with said pulsating signal generating means and said comparator means being responsive to signals supplied to said first and second inputs for generating first and second predetermined signals at said output representative of intervals during which the average amplitude of said applied signal is above and below the amplitude of a signal supplied from said reference source, respectively, said first and second predetermined signals being supplied to enable and disable, respectively, said pulsating signal generating means.

10. A tone detector circuit which comprises:

a threshold detector responsive to an applied signal for generating a pulsating signal having a first polarity during intervals between the instantaneous amplitude of said applied signal exceeding a prescribed level of a first polarity and exceeding a prescribed level of a second polarity and having a second polarity during intervals between the instantaneous amplitude of said applied signal exceeding said prescribed level of said second polarity and exceeding said prescribed level of said first polarity;

means for generating a signal representative of the average amplitude value of said applied signal;

means in circuit with said average signal generating means and said threshold detector and being responsive to the output from said average signal generating means to generate a signal for disabling said threshold detector during intervals in which the average amplitude of said applied signal is below a prescribed value;

a plurality of filters in circuit with said threshold detector, each of said filters being arranged to pass an individual frequency component of said pulsating signal;

a plurality of peak detector means in one-to-one circuit relationship with said filters for detecting the peak amplitude of the corresponding frequency component passed by said related filter; and a plurality of comparator means being in one-to-one circuit relationship with said peak detecting means for comparing said detected peak amplitude to a predetermined reference, wherein the frequency component having a peak amplitude greater than said reference represents the fundamental frequency of said applied signal.

11. A tone detector circuit as defined in claim 10 further including interval detecting means connected in circuit with said threshold detector and being responsive to said pulsating signal for generating a predetermined signal only during intervals in which the interval between pulses of said pulsating signal is less than a predetermined value and in which the duration of said pulsating signal exceeds a predetermined value, a plurality of coincidence gates in one-to-one circuit relationship with the outputs of said plurality of comparing means and in circuit relationship with said interval detecting means, said gates being responsive to generate a predetermined output signal only when the outputs from said comparing means and said interval detecting means are in coincidence.

* * * * *